United States Patent
Yamamoto

(10) Patent No.: US 12,549,055 B2
(45) Date of Patent: Feb. 10, 2026

(54) COIL BOBBIN AND BRUSHLESS MOTOR WITH THE SAME

(71) Applicant: NIDEC INSTRUMENTS CORPORATION, Nagano (JP)

(72) Inventor: Kazuma Yamamoto, Nagano (JP)

(73) Assignee: NIDEC INSTRUMENTS CORPORATION, Nagano (JP)

(*) Notice: Subject to any disclaimer, the term of this patent is extended or adjusted under 35 U.S.C. 154(b) by 252 days.

(21) Appl. No.: 18/303,579

(22) Filed: Apr. 20, 2023

(65) Prior Publication Data

US 2023/0353003 A1 Nov. 2, 2023

(30) Foreign Application Priority Data

Apr. 28, 2022 (JP) .................................. 2022-074902

(51) Int. Cl.
*H02K 3/52* (2006.01)
*H01F 5/02* (2006.01)
(Continued)

(52) U.S. Cl.
CPC ........... *H02K 3/522* (2013.01); *H01F 41/125* (2013.01); *H02K 1/165* (2013.01); *H02K 3/345* (2013.01);
(Continued)

(58) Field of Classification Search
CPC ...... H02K 3/522; H02K 3/345; H02K 15/085; H02K 2203/12; H01F 41/125; H01F 5/02
(Continued)

(56) References Cited

U.S. PATENT DOCUMENTS 3,230,489 A * 1/1966 Weyrich ............... H01F 5/04
336/198
3,581,260 A * 5/1971 Andreis ............... H01F 5/02
335/297
(Continued)

FOREIGN PATENT DOCUMENTS

JP 55143004 A * 4/1979 ............. H01F 5/02
JP 2008278603 A * 11/2008 ............. H02K 3/522
(Continued)

OTHER PUBLICATIONS

Translation of JP 55143004 A (Year: 1980).*
(Continued)

*Primary Examiner* — Oluseye Iwarere
*Assistant Examiner* — Daniel K Schlak
(74) *Attorney, Agent, or Firm* — JCIPRNET

(57) ABSTRACT

A coil bobbin for a stator of an electric motor includes a body part in a rectangular column shape around which a conductive wire is to be wound, and a first flange part provided at an end of the body part. The body part is structured so that the conductive wire starts to be wound around the body part from a root part which is an end part on the first flange part side and, in a case that a corner of the root part which is a starting point where the conductive wire starts to be wound is referred to as a first corner part, a face of the first flange part directed to the body part side is formed with a groove part which passes at a position adjacent to a position of the first corner part and guides the conductive wire to the first corner part.

4 Claims, 6 Drawing Sheets

(51) Int. Cl.
*H01F 41/12* (2006.01)
*H02K 1/16* (2006.01)
*H02K 3/34* (2006.01)
*H02K 15/085* (2006.01)

(52) U.S. Cl.
CPC .............. *H01F 5/02* (2013.01); *H02K 15/085* (2013.01); *H02K 2203/12* (2013.01)

(58) Field of Classification Search
USPC ........................................................ 310/215
See application file for complete search history.

(56) References Cited

U.S. PATENT DOCUMENTS

| | | | |
|---|---|---|---|
| 7,663,285 B2 | 2/2010 | Yumoto et al. | |
| 2004/0263015 A1* | 12/2004 | Okada | H02K 3/522 |
| | | | 310/194 |
| 2007/0229207 A1* | 10/2007 | Adunka | H01F 5/02 |
| | | | 336/200 |
| 2007/0278875 A1* | 12/2007 | Haga | H02K 3/522 |
| | | | 310/260 |
| 2008/0116755 A1* | 5/2008 | Sahara | H02K 3/522 |
| | | | 310/67 R |
| 2009/0127971 A1* | 5/2009 | Ishizeki | H02K 3/522 |
| | | | 310/216.074 |
| 2009/0189474 A1* | 7/2009 | van Heyden | H02K 3/522 |
| | | | 310/195 |
| 2010/0156200 A1* | 6/2010 | Busch | H02K 3/522 |
| | | | 310/12.21 |
| 2011/0115317 A1* | 5/2011 | Stark | H02K 1/148 |
| | | | 310/71 |
| 2018/0006511 A1* | 1/2018 | Kong | H02K 1/16 |
| 2020/0259385 A1* | 8/2020 | Hishida | H02K 3/46 |
| 2021/0044160 A1* | 2/2021 | Leiber | H02K 1/148 |
| 2024/0014697 A1* | 1/2024 | Sun | H02K 3/522 |

FOREIGN PATENT DOCUMENTS

| | | | | |
|---|---|---|---|---|
| JP | 2009118615 | | 5/2009 | |
| JP | 2012125057 A | * | 6/2012 | ............... H02K 3/46 |
| WO | WO-2021199494 A1 | * | 10/2021 | ............. H01F 27/32 |

OTHER PUBLICATIONS

Translation of JP 2008278603 A (Year: 2008).*
Translation of JP 2012125057 A (Year: 2012).*
Translation of WO 2021199494 A1 (Year: 2021).*

* cited by examiner

COIL BOBBIN AND BRUSHLESS MOTOR WITH THE SAME

CROSS REFERENCE TO RELATED APPLICATION

The present invention claims priority under 35 U.S.C. § 119 to Japanese Application No. 2022-074902 filed Apr. 28, 2022, the entire content of which is incorporated herein by reference.

TECHNICAL FIELD

At least an embodiment of the present invention may relate to a coil bobbin structuring a stator of an electric motor, and a brushless motor including the coil bobbin, and more specifically, relate to a bobbin structure in which a conductive wire is capable of being wound around a coil bobbin in good order.

BACKGROUND

In Japanese Patent Laid-Open No. 2009-118615 (Patent Literature 1), a coil bobbin is disclosed which is capable of reducing interference of a winding start portion of a conductive wire wound around a body part of the coil bobbin with a second-round conductive wire. The coil bobbin disclosed in Patent Literature 1 is provided with a slope on a rear face (inner side face) of a flange, and the conductive wire is guided along the slope to a midway position of one side face of the body part, and the conductive wire is started to be wound from the position.

As shown in FIG. 5, when a conductive wire is to be wound around a common coil bobbin, the conductive wire interferes with a winding start portion before winding of a first-round wire is finished. Therefore, the conductive wire is wound in an inclined state in each round on a last side face of a body part of a coil bobbin (hereinafter, the side face is simply referred to as a "last side face of a body part") and thus, a space is left in the root portion. Further, a conductive wire for a wire connection and connection with the other coil is continued from the winding start portion of the conductive wire and thus, a second and subsequent rounds of the conductive wire are interfered with the winding start portion. Therefore, the second and subsequent rounds of the conductive wire are also wound in an inclined state in each round on the last side face of a coil bobbin.

Further, as shown in FIG. 6, when a conductive wire is started to wind from a midway position of a side face of a body part, the conductive wire wound on the side face is wound so as to be bent with the winding start portion of the conductive wire as a boundary. Further, when the conductive wire is wound on the side face with a minimal length, the conductive wire interferes with the preceding conductive wire (as shown by the alternate long and short dash line in FIG. 6). Therefore, an operation is required in which, first, a conductive wire is pulled to a position where the conductive wire does not interfere with the preceding conductive wire and, after that, the conductive wire is pulled down to the preceding conductive wire side. This operation increases a processing time of a coil winding machine and also influences quality of a coil in so-called winding sag and the like.

SUMMARY

At least an embodiment of the present invention may advantageously provide a coil bobbin around which a conductive wire is capable of being wound in good order while suppressing an interference of a winding start portion of the conductive wire, and provides a brushless motor including the coil bobbin.

According to at least an embodiment of the present invention, there may be provided a coil bobbin structuring a stator of an electric motor, and the coil bobbin includes a body part which is a core part in a rectangular column shape around which a conductive wire is to be wound, and a first flange part and a second flange part which are flange-shaped parts provided on both ends in a longitudinal direction of the body part. The body part is structured so that a conductive wire starts to be wound around the body part from a root part which is an end part on the first flange part side and, in a case that a corner which is one of corners of the root part and is a starting point where the conductive wire starts to be wound around the root part is referred to as a first corner part, a face of the first flange part directed to the body part side is formed with a groove part which passes at a position adjacent to a position of the first corner part and guides the conductive wire to the first corner part.

When a conductive wire is guided to a corner of the body part through the groove part of the flange part and the conductive wire is started to be wound from the corner, bending of the conductive wire as shown in Patent Literature 1 is avoided and, in addition, the conductive wire can be routed with a minimal length even in the last side face of the body part. Further, the conductive wire for a wire connection and connection with the other coil is accommodated in the groove part and thus, the conductive wire does not interfere with the second and subsequent rounds of the conductive wire. As a result, complication of processing by using a coil winding machine and a winding sag are prevented and a winding number of the conductive wire around the coil bobbin can be maximized.

Further, in the coil bobbin in accordance with at least an embodiment of the present invention, the groove part is extended in a straight-line shape, and both ends of the groove part penetrate through side faces of the first flange part. According to this structure, the entire coil bobbin can be injection-molded as one part and thus, an assembling process is simplified. In this case, an iron core is insert-molded in the coil bobbin.

Further, in the coil bobbin in accordance with at least an embodiment of the present invention, in a case that one of side faces of the body part whose face includes the first corner part is referred to as a first side face, and that a corner of the first side face on an opposite side to the first corner part is referred to as a second corner part, the groove part is adjacent to the first side face and is extended along and in parallel with the first side face, and the conductive wire is wired from the second corner part side toward the first corner part side in the groove part. According to this structure, the conductive wire can be wound in good order without a space at the root part even in the last side face of the body part.

In this case, the groove part is provided with an inlet opening which penetrates through a side face of the first flange part and is an opening for introducing the conductive wire into the groove part, and the groove part is provided with a slope part whose depth gradually becomes shallow from the inlet opening side toward the first corner part side. The groove part may decrease strength of the coil bobbin. However, a depth of the groove part is suppressed by forming the groove part in a slope shape.

Further, in this case, both ends of the groove part penetrate through side faces of the first flange part, the groove part is further provided with a flat part whose depth is constant, and the slope part is provided at a position adjacent to the second corner part, and the flat part is continuously extended from the slope part toward the first corner part. According to this structure, a depth of the groove part can be minimized, and the entire coil bobbin can be injection-molded as one part.

Further, at least an embodiment of the present invention may advantageously provide a brushless motor including a plurality of coils each of which is structured of the coil bobbin described above around which the conductive wire is wound, and a stator having a plurality of the coils. When the coil bobbin in accordance with the present invention is adopted, operation quality of the motor is further stable. Further, when the coil bobbin in accordance with the present invention is used, a size of a brushless motor can be reduced.

Effects of the Invention

As described above, according to the coil bobbin and the brushless motor in the present invention, an interference of a winding start portion of the conductive wire is suppressed and the conductive wire is capable of being wound in good order.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of a coil bobbin and a brushless motor in accordance with the present invention will be described below with reference to the accompanying drawings. A coil bobbin 10 described below is used as a coil which structures a stator 80 of a brushless motor 90 described below by winding a conductive wire around the coil bobbin 10.

An "upper and lower" direction in the following descriptions is a direction parallel to the "Z"-axis of the coordinate axes described in FIG. 1, and the "Z1" side is an "upper" side and the "Z2" side is a "lower" side. A "front and rear" direction is a direction parallel to the "X"-axis of the coordinate axes, and the "X1" side is a "front" side and the "X2" side is a "rear" side. Further, a "right and left" direction is a direction parallel to the "Y"-axis of the coordinate axes, and the "Y1" side is a "right" side and the "Y2" side is a "left" side.

Structure of Coil Bobbin

Figure 1:
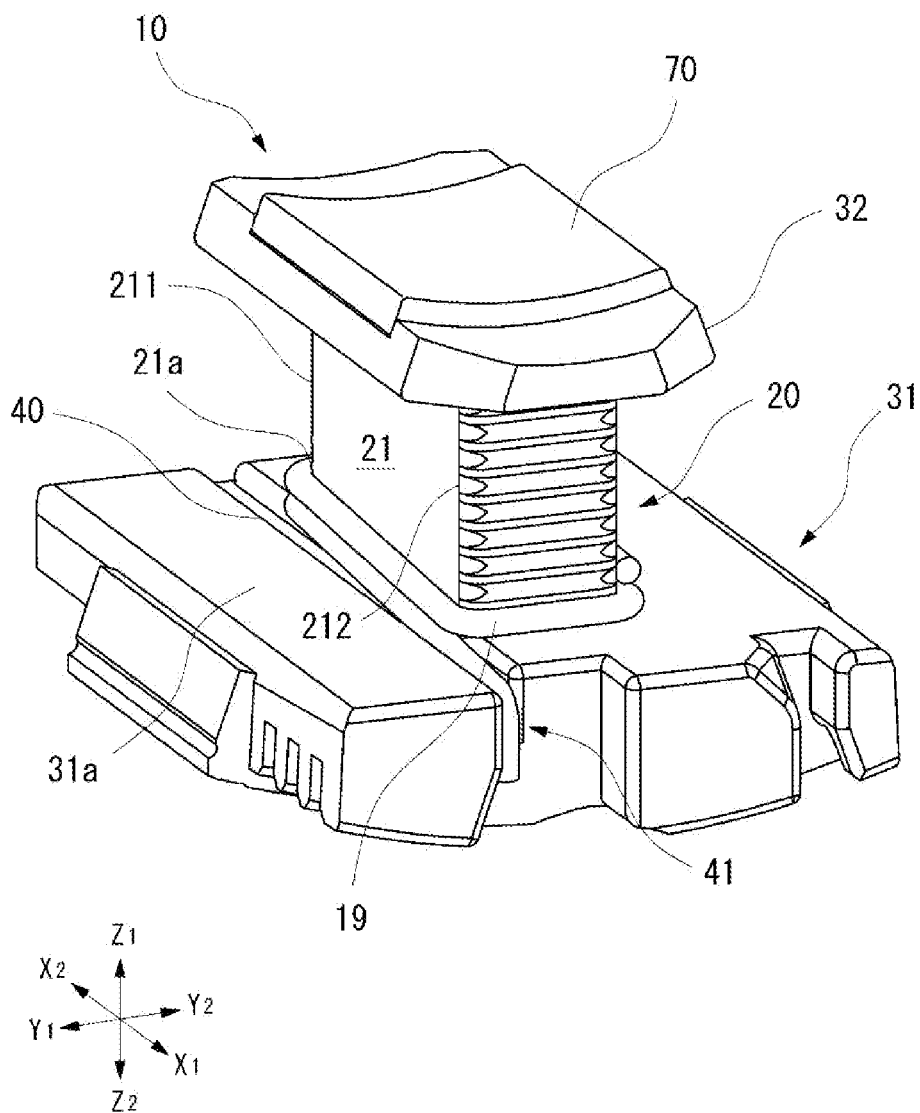
FIG. 1 is a perspective view showing an outward appearance of a coil bobbin in accordance with an embodiment of the present invention.

FIG. 1 is a perspective view showing an outward appearance of a coil bobbin 10. Next, an entire structure of a coil bobbin 10 in accordance with an embodiment of the present invention will be described below with reference to FIG. 1.

The coil bobbin 10 is provided with a body part 20 which is a rectangular column-shaped core part around which a conductive wire 19 is to be wound, a first flange part 31 which is a flange-shaped part provided on a lower side of the body part 20, and a second flange part 32 which is a flange-shaped part provided on an upper side of the body part 20. An upper face 31a of the first flange part 31 is formed with a groove part 40 which is a slit for guiding the conductive wire 19 to the body part 20.

Of four side faces structuring a peripheral face of the body part 20, in a case that a side face directed to a right side ("Y1" side) is referred to as a first side face 21, the groove part 40 is formed so as to be adjacent to the first side face 21 and extended in parallel with and along the first side face 21. The first side face 21 is provided with a first corner part 211 which is a corner structuring a side on its rear side ("X2" side) and a second corner part 212 which is a corner structuring a side on its front side ("X1" side). The groove part 40 in this embodiment is provided with an inlet opening 41 which is penetrated through a side face of the first flange part 31 and is an opening for introducing the conductive wire 19 into the groove part 40. The conductive wire 19 in the groove part 40 is passed through the inlet opening 41 and then, routed from the second corner part 212 side to the first corner part 211 side, and the conductive wire 19 is wound around the body part 20 from a root part 21a of the first corner part 211 as a starting point.

Further, both ends of the groove part 40 in this embodiment penetrate through side faces of the first flange part 31. As a result, the coil bobbin 10 can be injection-molded as one part and thus, an assembling process is simplified. Further, in the coil bobbin 10 in this embodiment, an iron core 70 is insert-molded.

Introduction Structure of Winding

Figure 2A:
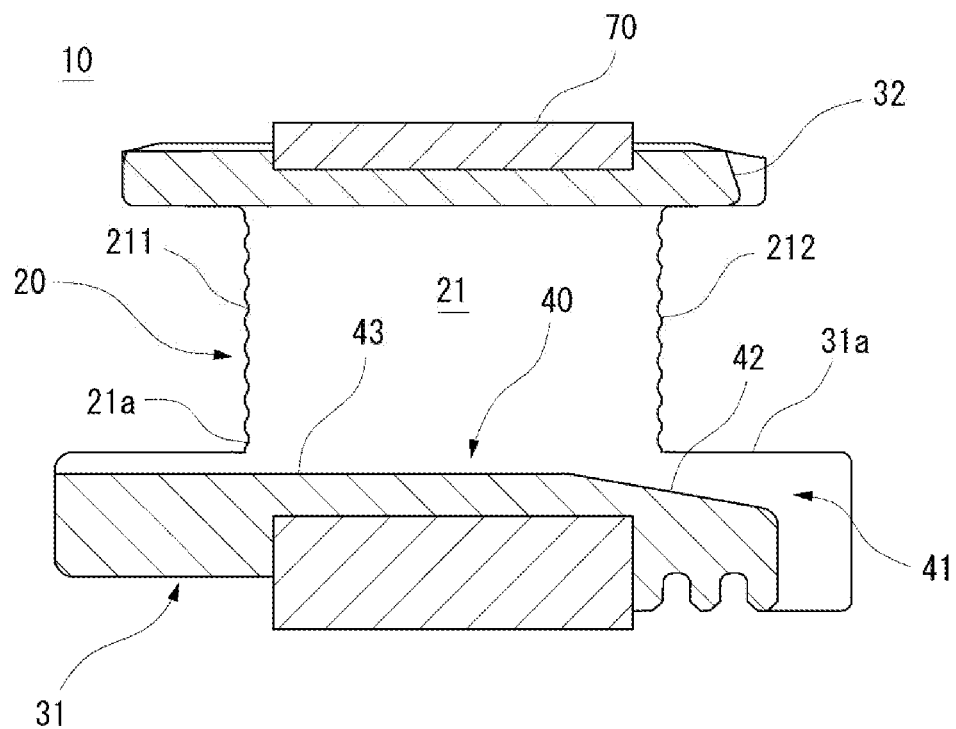
FIGS. 2A and 2B are cross-sectional side views showing a coil bobbin.
Figure 2B:
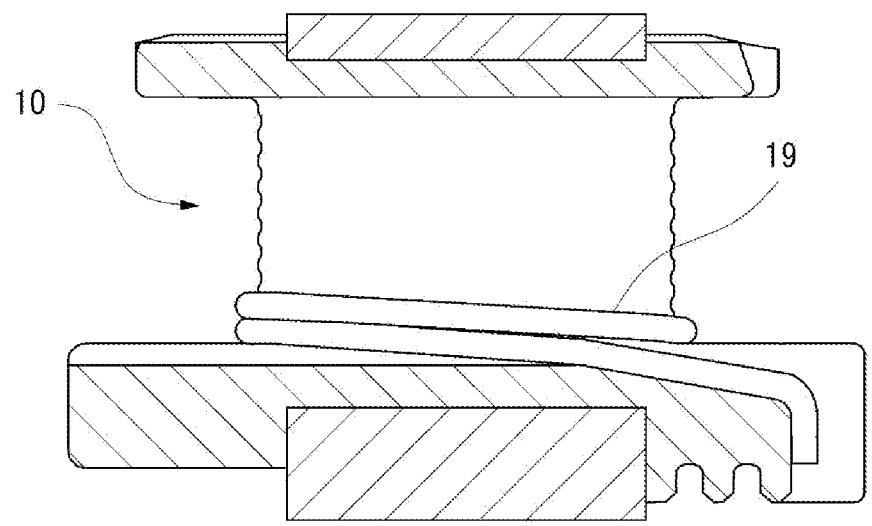

FIGS. 2A and 2B are cross-sectional side views showing the coil bobbin 10 which is viewed from a right side. A structure of the groove part 40 of the coil bobbin 10 will be described below with reference to FIGS. 2A and 2B.

Figure 6:
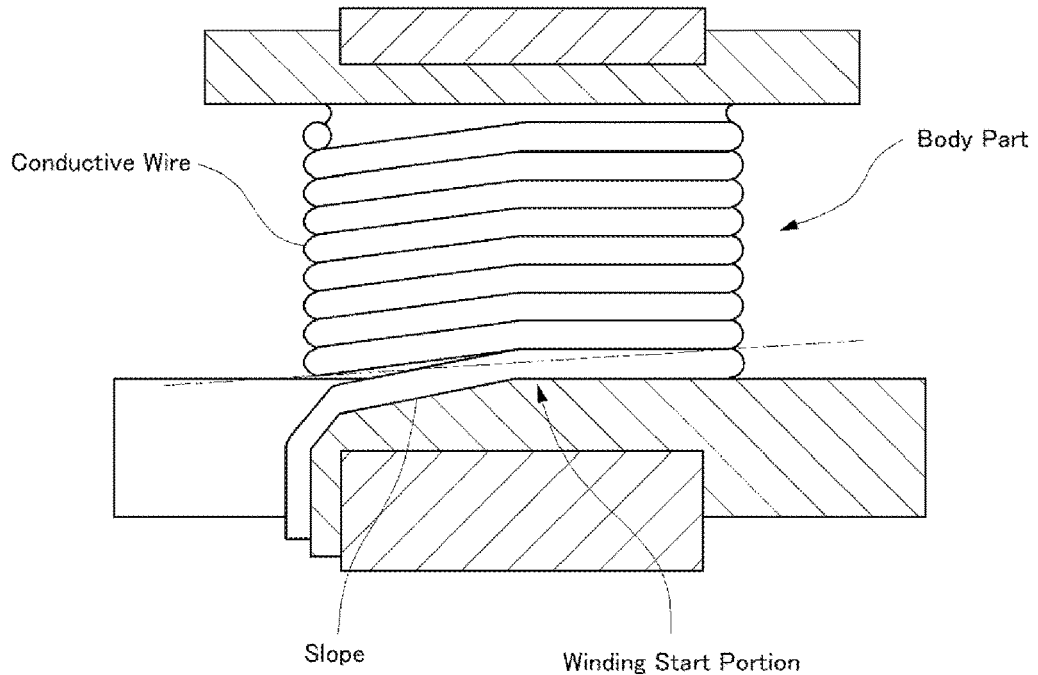
FIG. 6 is a cross-sectional side view showing an example of a conventional coil bobbin.

As described above, in the coil bobbin 10 in this embodiment, the conductive wire 19 is wired within the groove part 40 from the second corner part 212 side toward the first corner part 211 side and is wound around the body part 20 with the root part 21a of the first corner part 211 as a starting point. In this embodiment, the conductive wire 19 is guided to the first corner part 211 of the body part 20 through the groove part 40 and is started to wind around the body part 20 from the first corner part 211 and thus, a bent part of the conductive wire as shown in FIG. 6 is avoided. The first side face 21 is a side face on which each round of the conductive wire 19 wound around the body part 20 is wound last. However, also in the first side face 21, the conductive wire 19 can be routed with a shortest distance without interfering with the previous round of the conductive wire 19. Further, the conductive wire 19 for a wire connection and connection with the other coil is accommodated in the groove 40 and thus, the conductive wire 19 does not interfere with the second and subsequent rounds of the conductive wire 19. As described above, according to the coil bobbin 10 in this embodiment, the conductive wire 19 can be wound in good order without a space at the root part 21a of the first side face 21, and a winding number of the conductive wire 19 around the coil bobbin 10 can be maximized while preventing complication of processing of a coil winding machine and a winding sag.

Slope Part and Flat Part

The groove part 40 in this embodiment is provided with a slope part 42 whose depth gradually becomes shallow from the inlet opening 41 toward the first corner part 211 side, and a flat part 43 whose depth is constant. The slope part 42 is provided at a position adjacent to the second corner part 212 so as to cross over the second corner part 212, and the flat part 43 is continuously extended from the slope part 42 toward the first corner part 211.

The groove part 40 partly reduces a wall thickness of the first flange part 31 and thus, the groove part 40 may affect strength of the coil bobbin 10. In this embodiment, the slope part 42 and the flat part 43 are combined with each other and thus, reduction of the strength of the coil bobbin 10 due to a depth of the groove part 40 is suppressed to a necessary minimum. In this case, if the groove part 40 is provided with no slope part 42 and the entire groove part 40 is formed of only the flat part 43, the first round conductive wire 19 is slightly interfered with the conductive wire 19 accommodated in the groove part 40 at a position of the second corner part 212 of the first side face 21.

Modified Examples of Groove Part

Figure 3A:
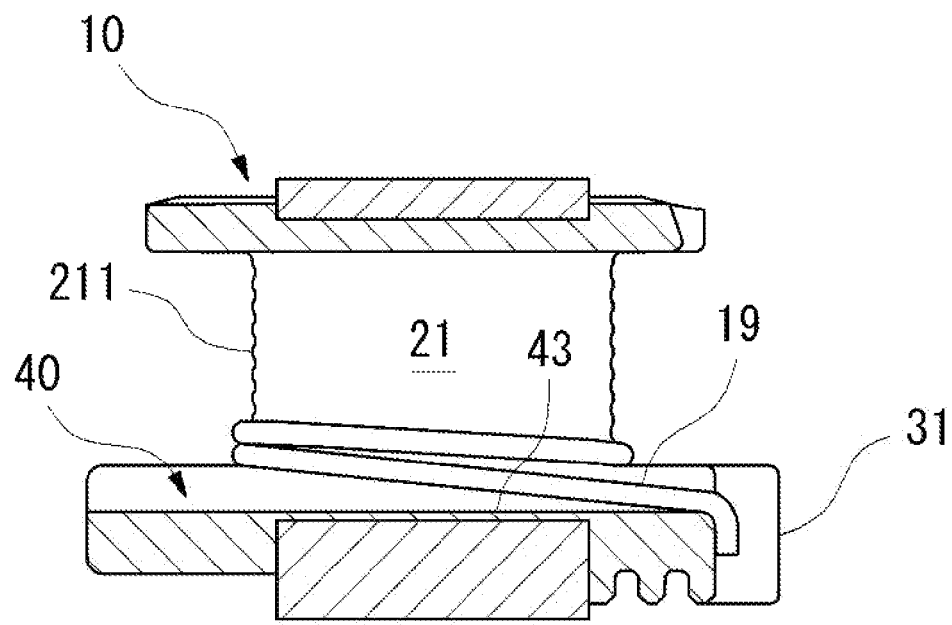
FIGS. 3A, 3B and 3C are cross-sectional side views showing modified examples of a groove part.
Figure 3B:
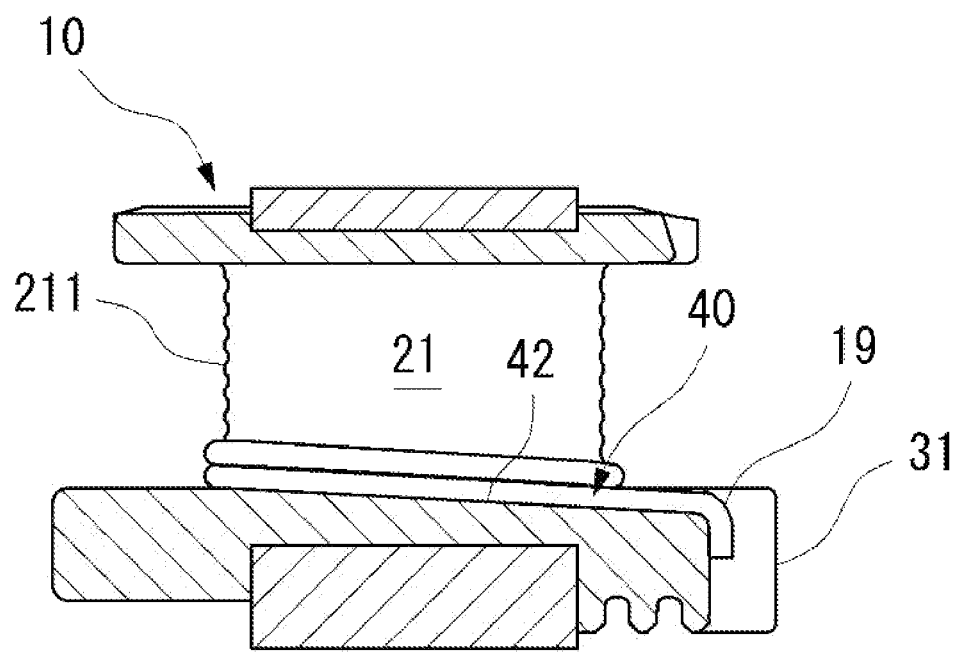
Figure 3C:
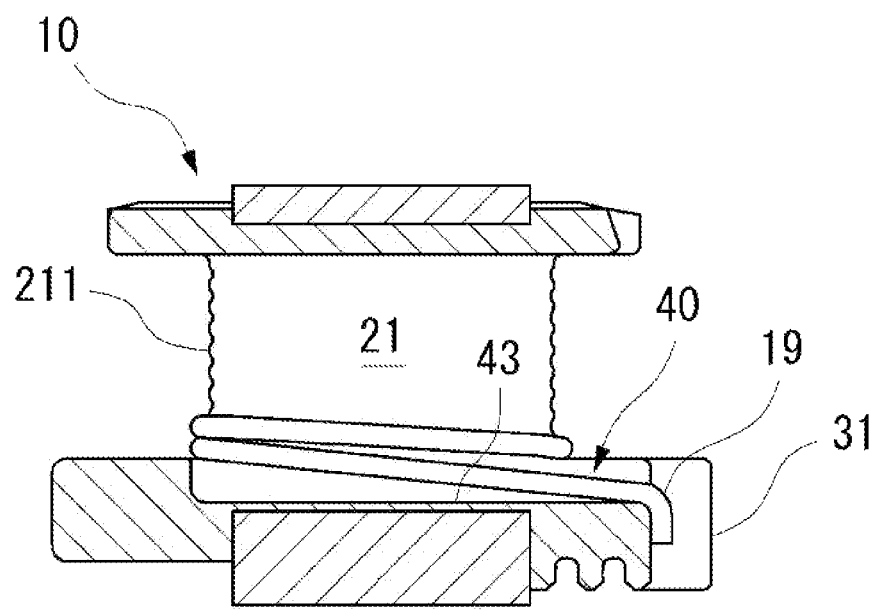

FIGS. 3A, 3B and 3C are cross-sectional side views showing modified examples of the groove part 40. In a case that reduction of the strength of the coil bobbin 10 due to the groove part 40 does not cause a problem, for example, as shown in FIG. 3A, the groove part 40 may be structured of only a flat part 43 having a sufficient depth without the slope part 42. Further, in a case that injection molding of the coil bobbin 10 is not difficult, and that manual assembling work does not cause a problem, alternatively, in a case that reduction of the strength due to the groove part 40 causes a problem, for example, as shown in FIG. 3B, the groove part 40 may be structured of only the slope part 42 or, as shown in FIG. 3C, the groove part 40 may be formed only in a range necessary to guide the conductive wire 19 to the first corner part 211 instead of providing the groove part 40 penetrated through the first flange part 31.

Brushless Motor

Figure 4:
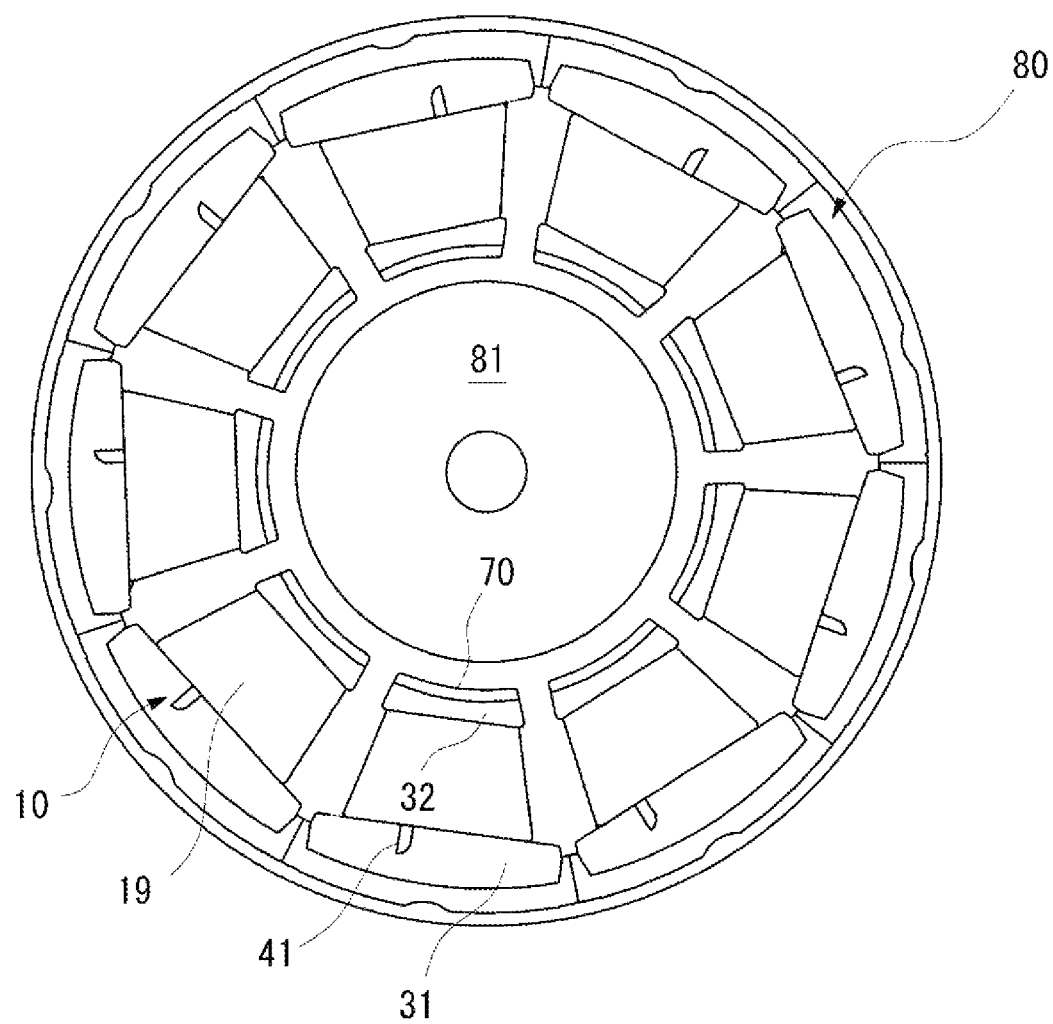
FIG. 4 is a transparent plan view showing an internal structure of a brushless motor in accordance with an embodiment of the present invention.
Figure 5:
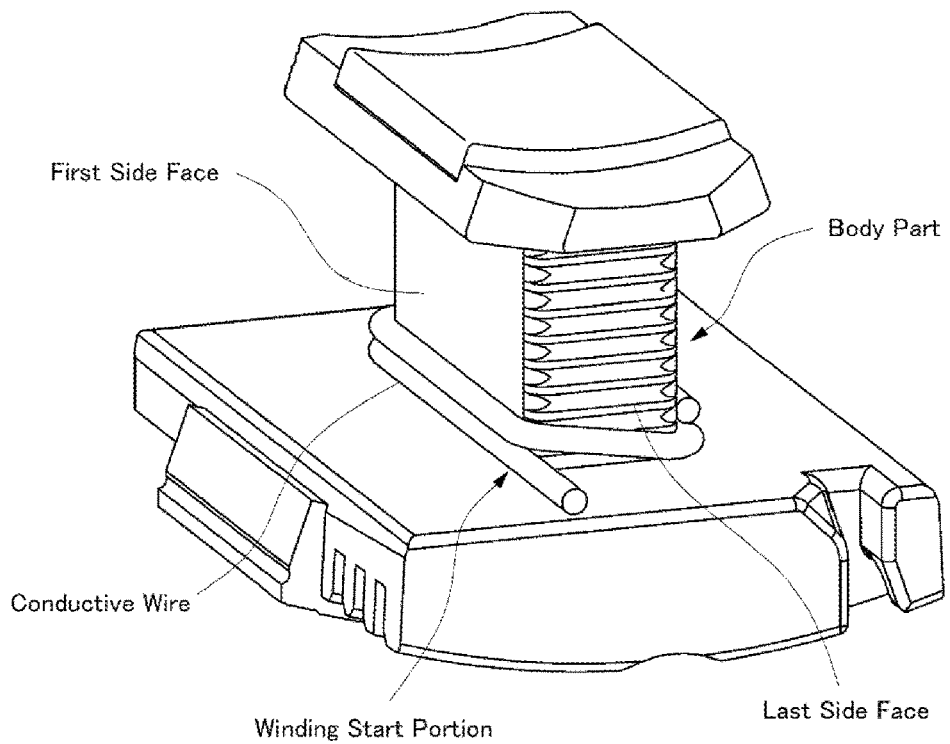
FIG. 5 is a perspective view showing an example of a conventional coil bobbin.

FIG. 4 is a transparent plan view showing an internal structure of a brushless motor 90 in accordance with an embodiment of the present invention. A brushless motor 90 includes a stator 80 having a plurality of coils each of which is structured of the coil bobbin 10 in the embodiment described above around which the conductive wire 19 is wound, and a rotor 81. The brushless motor 90 provides a stable operation quality by adopting the coil bobbin 10 in the embodiment described above. Further, a winding number of the conductive wire 19 can be maximized and thus, an output in comparison with the size is increased.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A coil bobbin structuring a stator of an electric motor, the coil bobbin comprising:
    a body part which is a core part in a rectangular column shape around which a conductive wire is to be wound; and
    a first flange part and a second flange part which are flange-shaped parts provided on both ends in a longitudinal direction of the body part;
    wherein the body part is structured so that the conductive wire starts to be wound around the body part from a root part which is an end part on a side of the first flange part; and
    in a case that a corner which is one of corners of the root part and is a starting point where the conductive wire starts to be wound around the root part is referred to as a first corner part, a face of the first flange part directed to a side of the body part is formed with a groove part which passes at a position adjacent to a position of the first corner part and guides the conductive wire to the first corner part, wherein both ends of the groove part penetrate through side faces of the first flange part,
    in a case that one of side faces of the body part whose face includes the first corner part is referred to as a first side face, and that a corner of the first side face on an opposite side to the first corner part is referred to as a second corner part,
    the groove part is adjacent to the first side face and is extended along and in parallel with the first side face, and
    the conductive wire is wired from a side of the second corner part toward a side of the first corner part in the groove part,
    the groove part comprises an inlet opening which penetrates through a side face of the first flange part and is an opening for introducing the conductive wire into the groove part, and
    the groove part comprises a slope part whose depth gradually becomes shallow from a side of the inlet opening toward the side of the first corner part,
    both ends of the groove part penetrate through side faces of the first flange part,
    the groove part further comprises a flat part whose depth is constant,
    the slope part is provided at a position adjacent to the second corner part, and
    the flat part is continuously extended from the slope part toward the first corner part.

2. The coil bobbin according to claim 1, wherein the groove part is extended in a straight-line shape.

3. The coil bobbin according to claim 1, wherein an iron core is insert-molded in the coil bobbin.

4. A brushless motor comprising:
    a plurality of coils each of which is structured of the coil bobbin defined by claim 1 around which the conductive wire is wound; and
    a stator comprising the plurality of the coils.

* * * * *